Figure 1:
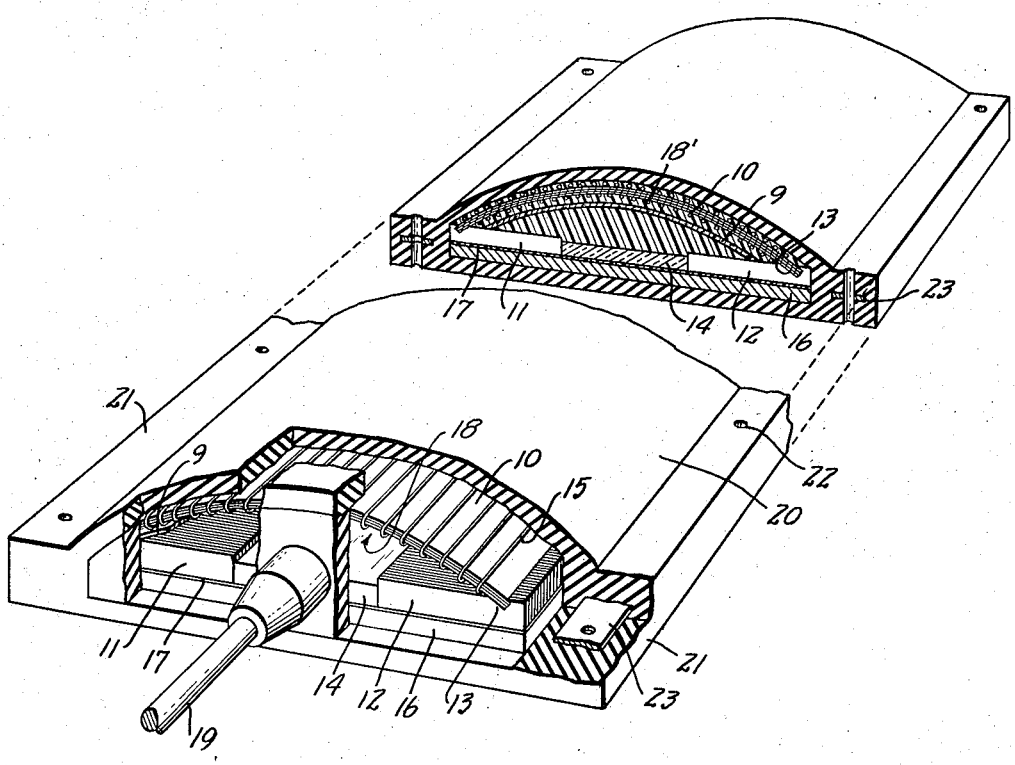

March 3, 1959  W. T. HARRIS  2,876,427
TRANSDUCER
Filed Dec. 30, 1954

INVENTOR.
WILBUR T. HARRIS
BY
*Mitchell & Bechert*
ATTORNEYS

United States Patent Office 2,876,427
Patented Mar. 3, 1959

2,876,427

TRANSDUCER

Wilbur T. Harris, Southbury, Conn., assignor to The Harris Transducer Corporation, Woodbury, Conn., a corporation of Connecticut Application December 30, 1954, Serial No. 478,837

20 Claims. (Cl. 340—11)

My invention relates to an electromechanical transducer and, in particular, to a construction adapted for underwater use primarily in the audio-frequency range.

Radially vibrating cylindrical transducers of the magneto-strictive type may be designed from either one of two distinctly different viewpoints, yielding two classes of transducers having distinct and contrasting properties. While the differences appear at first to be differences in degree, they seem fundamental and marked to such an extent that they should be regarded as differences in kind. For identification, these basic varieties can be called the thick-wall and the thin-wall types, or Type I and Type II, respectively.

Type I (thick wall) is well known. It is moderately efficient at its resonant frequency, but is normally very poor at one fourth of an octave away from this frequency. Here efficiency is dependent on at least a moderately high mechanical Q, and increases with the wall thickness of the cylinder, which for a magnetostrictive case is assumed to be laminated.

Type II (thin wall) has a very low mechanical Q in water, and operates mainly in the broad frequency region below resonance, the stiffness-controlled frequency region. Efficiency increases as the wall is made thinner, in direct contrast to Type I. There is no sharp efficiency peak at resonance, but only a broad smooth efficiency maximum, since Q is only in the order of 1.

The resonant frequency, or frequency of maximum efficiency, is generally about three times lower for transducers of Type II than for transducers of Type I of the same diameter. Thus, for low-frequency use, the Type II cylinder is about one third the diameter, and perhaps one thirtieth the weight, of the Type I cylinder. Because of its reduced size, the energy density which Type II can handle is necessarily reduced, but not necessarily the efficiency. Therefore, since (for low-frequency sonar arrays) large surface area is necessary for the sake of directivity, the power-processing capacity of Type II transducers may be adequate in highly directional assemblies.

The behaviours and distinctions of the two basic transducer types can be understood in terms of the following equation:

$$v = \frac{F}{R_A + R_M - \frac{jk}{\omega} + j\omega m}$$

in which $v$ is the alternating velocity of the radiating surface, $F$ is the alternating driving force (containing factors determined by the mechanical structure and the factor $0.4\pi N i \lambda \mu$, where $i = i_0 \cos \omega t$), $R_A$ is radiation resistance (so defined that $R_A v^2$ = acoustic power output), $R_M$ is internal frictional damping causing dissipation ($R_M v^2$), $k$ is the mechanical stiffness of the device in the medium, and $m$ is the apparent oscillating mass of the device in the sound medium.

In Type I, the thick-walled type, one or the other of the reactive terms in the impedance (the denominator of the expression) is always large compared to the total of the resistance terms. However, at one frequency, namely, resonace ($\omega_0$), the reactive terms are equal and opposite in sign, and hence cancel. At this frequency, the velocity is determined by the resistance only, and a sharp maximum in efficiency occurs. If the resistance is largely radiative (acoustic), the efficiency will be high at this frequency. At other frequencies, the mechanical reactance is so high that the device cannot be made to respond significantly, and in practice the efficiency is very low. When very high force is required to produce significant velocity (i. e. off resonance), electrical dissipation, which is not explicitly shown in the force term, consumes a large part of the input power.

In the Type II (thin-walled, broad-band) transducer, the stiffness- and mass-reactive terms are both small, in the same order of magnitude as the resistive terms; hence, when the reactive terms cancel at resonance, no prominent resonant peak occurs. If, therefore, the $R_A$ term can be made to dominate, and force can be exerted with only small electrical losses, the result is broad-band high-efficiency performance. Efficient broad-band performance is often far preferable to equal efficiency in a narrow band. Furthermore, a broad-band transducer having an efficiency maximum at a given frequency is generally about one third the diameter of a narrow-band transducer having its efficiency maximum at the same frequency, as previously noted.

In spite of the various considerations expressed above with regard to properties of Type I and Type II cylindrical transducers, substantial problems of size and weight are encountered (whether Type I or Type II) when attempting to achieve directional performance with array configurations. The inherently omnidirectional property of each transducer element means that, when combined in an array to achieve directional properties, there is considerable excess bulk, and the power-to-weight ratio suffers.

It is, accordingly, an object of the invention to provide an improved transducer construction of the character indicated.

It is another object to provide a new transducer element construction, particularly adapted to plural combination in arrays to achieve directional properties.

It is also an object to meet the above objects with a device characterized by high efficiency and power-handling capacity when used as a transmitter and also by good performance and reception when used merely as a hydrophone.

It is still another object to provide a new type of transducer construction achieving many of the advantages of radially strictive cylindrical transducers and, at the same time, characterized primarily by a unidirectional rather than an omnidirectional response.

It is a general object to meet the above objects with a basically rugged structure presenting relatively few constructional problems, and inherently achieving a directional response with a good power-to-weight ratio.

Figure 2:
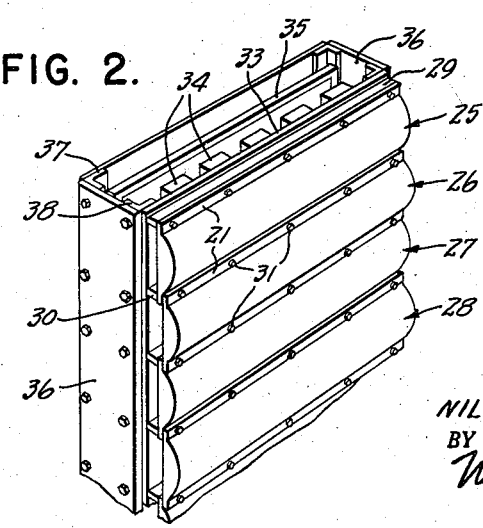

Other objects and various further features of novelty and invention will be pointed out or will occur to those skilled in the art from a reading of the following specification in conjunction with the accompanying drawings. In said drawings, which show, for illustrative purposes only, preferred embodiments of the invention:

Fig. 1 is a perspective view of a transducer element incorporating features of my invention and partly broken away to reveal internal structural features; and Fig. 2 is a perspective view of an array utilizing elements, as of the type shown in Fig. 1, to achieve desirable directional properties.

Briefly stated, my invention contemplates a basically new type of transducer construction, whereby the high efficiency and power-handling capacity of the ordinarily omnidirectional radially strictive cylindrical transducer is achievable with a predominantly directional response and with a saving in space or volume requirements. Basically, my improved transducer utilizes an arcuate segment of a cylindrical transducer of one of the above-discussed general types. The general principle is applicable to any radially strictive device, such as barium titanate or the like, but, in the form specifically disclosed herein, magnetostrictive effects are utilized, and therefore a complete return path is required for circulation of magnetic flux. Because of its overall cross-section appearance, I call my construction a "new-moon" transducer.

In the magnetostrictive variety of new-moon transducer, the return flux is passed directly between the limits of the cylindrical arc of the transducer and may extend directly chordally of these limits. Both the arc and the chord must of course be of flux-conducting material, and I prefer that one of these parts shall be magnetostrictive while the other exhibits a relatively non-magnetostrictive effect; in the specific form disclosed, the arc is magnetostrictive and the chord is of relatively non-magnetostrictive material, such as silicon steel, which, to reduce eddy-current losses, may be a stack of silicon-steel laminations. The transducer is completed by providing means for magnetizing the flux path and a signal winding for electromagnetic coupling; the magnetizing means may be and preferably is a permanent magnet, as of iron-oxide ceramic known as ferrite. Certain details of construction of the elemental device to be described render the same adaptable to use in multiple-element arrays, and a specific array is also disclosed.

Referring to Fig. 1 of the drawings, my invention is shown in application to a basic new-moon transducer element, comprising essentially an elongated cylindrically arcuate radially strictive element 10, which may comprise a plurality of laminations of magnetostrictive material, such as nickel, bonded to each other to form a single-piece arc. The flux path may be considered (for any cross section of the device) to include the arcuate part 10 and a return path of flux-conducting material; an arcuate pressure-release layer 9, as of cork, Corprene, or the like, is positioned behind the arcuate part 10. As indicated generally above, the return path may extend directly chordally of the limits of the arc 10; in the form shown, the chord portion comprises two flat stacks 11—12 of laminations of a material exhibiting relatively low magnetostrictive effect, such as silicon steel. The laminations may be grooved, as at 13, to accommodate inserted ends of the arc 10, for firm and positive anchorage thereof.

Magnetizing means may comprise a magnetizing winding linked to the described flux path, but I indicate my preference for a permanent magnet 14 which may be inserted between the stacks 11—12 to form a part of the return path. The permanent magnet 14 is preferably a single block or a longitudinal succession of blocks of suitably formed iron-oxide ceramic, known as a ferrite, and bonded at both lateral extremities to the respective stacks 11—12 of return-path laminations.

The basic new-moon element construction further includes a signal winding 15 enveloping the flux path defined by the chord and arc, and it is convenient to apply the signal winding only over the arc portion 10 (as shown). To provide a solid base for the elemental construction described, I show a base-plate 16 of non-magnetic material, such as aluminum, the plate 16 being coextensive with the chordal return path 11—12—14 and with the longitudinal axis or extent of the entire transducer. A variety of methods may be employed for securing the base plate 16 to the elements of the return path, but I merely suggest, at the layer 17, the application of a sufficient thickness of phenolic or other insulating and bonding agent, to provide an extensive area of firmly bonded support and to avoid short-circuits between laminations. For the sake of clarity at the front or left end in the drawing, the inner volume 18 of the transducer is shown open and unfilled, but preferably this inner volume is completely and intimately filled with sound-transmitting material, such as plastic potting (suggested at 18'), which may not only fill the space within the transducer but also coat and thoroughly bond and support and cover all externally exposed portions of the described parts.

To complete the assembly, a lead cable 19 may be provided at one end, and a protective boot of sound-transmitting rubber or rubber-like material 20 may completely and intimately encase the potted device. For mounting purposes, it is convenient to provide integral resilient flanges, as at 21, projecting integrally out from the limits of the chord and arc, and substantially coextensive with the longitudinal dimension of the transducer. Mounting holes, as at 22, may be provided at intervals along the longitudinal dimension of the flanges 21, and I prefer that the flanges 21, particularly in the vicinity of the mounting holes 22, be internally reinforced, as suggested at 23 and as described in greater detail in my copending patent application Serial No. 454,712, filed September 8, 1954.

In operation, it will be seen that, for the case of a magnetostrictive arc 10 and of a relatively non-magnetostrictive chord 11—12—14, the basic organization of my transducer is analogous to a bow of variable arcuate extent, with fixedly anchored ends. For the situation in which the chord is magnetostrictive and the arc 10 is relatively non-magnetostrictive, the system is analogous to a bow of fixed arcuate extent but having ends which are variably spread. In either event, the action is such, by virtue of the limited arcuate extent (i. e. less than 180°) of the arc, that greater radial displacements occur for the central portion of the arc than could be achieved for an arc of 180° or for a fully cylindrical magnetostrictive core. More importantly, the radial displacements are directionally confined, so that the organization lends itself particularly to array configurations.

It will be understood that it is all the same whether the arcuate portion 10 is stated to be less than 180° or whether the chord portion 11—12—14 is stated to be less than twice the effective radius of the chord portion 10. The latter expression may, however, serve to make more clear the basic nature of my transducer as outlined above, characterized as it is by elastic deformation of the arc portion 10 through mechanical reaction between the arc and chord portions of the core, in the context of the geometry shown and set forth. The actual displacements achieved at the central part of the arc 10 exceed those attributable solely to magnetostrictive action, all because of the described dissimilarity of core materials and because of the chord-arc geometry, as will be understood.

As indicated, the elemental new-moon transducer of Fig. 1 may be readily adapted in multiple to the construction of arrays, such as the array shown in Fig. 2. In developing the array of Fig. 2, the separate elemental new-moon transducers 25—26—27—28 are secured in side-by-side adjacency, with the flanges 21 of one transducer (25) overlapping the flanges 21 of the next adjacent transducer (26). Elongated mounting struts 29—30 may receive the securing bolts 31 passing through the mounting flanges, in order to provide a free-flooded space behind the chord parts of the transducer elements.

It is inherent in the described array that response shall be predominantly unidirectional, that is, in the direction to the right and down in the sense of Fig. 2, and that relatively little response will be exhibited in the back direction. In order to minimize this back response in the form shown, I provide a diaphragm member 33 on which are supported a plurality of transversely extending rod or bar-type damping devices 34; these bars may be of suitably loaded rubber or rubber-like material bonded to the plate or diaphragm 33, and I indicate my preference for rubber bars 34 loaded with aluminum pellets. In addition to damping means 34 to minimize back response, I also show a reflecting channel 35 containing compliant material, such as air-cell rubber. The panel 35 may be a single assembly serving the entire transducer array and of the construction described in greater detail in my copending patent application Serial No. 426,219, filed April 28, 1954, now Patent No. 2,811,216.

In order to support the reflecting panel 35 and the damping assembly 33—34 in uncoupled relation, I have shown rubber or rubber-like side members 36 connecting the support means for the panel 35 to the support means for the diaphragm 33; in each case, angle members 37—38 suffice to provide connection to the rubber side member 36. When the electrical interconnections between new-moon elements 25—28 have been established and sealed, the device of Fig. 2 as described is inherently rugged enough to withstand mounting and use without further protection. However, for appearance sake, and to provide against direct fouling of the transducer element, the described assembly may be mounted within a free-flooded dome of known construction, but no particular precautions need be taken within the dome to reduce back response.

The new-moon transducer shown in the drawings may be viewed as Type II, or the thin-walled, broad-band type, and it is advantageous for lower audio frequencies especially. Its advantages appear from the following comparative consideration of corresponding fully cylindrical elements. A 1-kc. (maximum efficiency), Type-I, cylindrical (resonant) magnetostrictive transducer would have a diameter of about 5 feet, while a corresponding Type-II transducer would have a diameter of about 20 inches. The 5-foot diameter (Type I) is totally unsuited for array use, and the 20-inch diameter Type II is undesirably large. On the other hand, the new-moon adaptation of the Type II, as shown in Fig. 1, and employing a segment of a 20-inch diameter cylinder (with a planar laminated-silicon-steel, magnetic-return circuit), is relatively thin and of lesser transverse dimension, so that an array as in Fig. 2 can make a compact wall of transducer radiating surface.

Besides its compactness and convenience for use in arrays, my new-moon construction is ideally adapted to the use of permanent magnets (14) in the magnetic circuit, to make the unit immune to depolarization when energized at high power levels. Further, it is ideally adapted to use in unidirectional arrays, and to building into baffle structures which shield the transducers on the back or flat side.

It will be seen that I have described a novel transducer construction lending itself particularly to directional response and yet possessing the inherent advantages of the otherwise unidirectional, radially-strictive, cylindrical transducer. The basic construction is so versatile that it may be designed for narrow- or broad-band performance and is not limited as to applicability in the lower audio range; however, in the lower audio range, the permanent-polarization feature permits making maximum use of the active material and achieves a high power-to-weight ratio. Generally speaking, for relatively narrow-band applications (Type I), it is desirable to design the arcuate member 10 with a ratio of radius-of-curvature to wall-thickness of about 5:1, whereas, for broad-band applications (Type II), the ratio is more in the order of 50:1. Aside from inherent broad-band characteristics, and greatly reduced size and weight of individual elements, the Type II new-moon transducer is ordinarily preferred for low-frequency applications because of its superior efficiency, due to low eddy-current losses inherent in the construction.

While I have described the invention in detail for the preferred form shown, it will be understood that modifications may be made within the scope of the invention as defined in the claims which follow.

I claim:

1. A transducer comprising a cylindrical arc of radially strictive material, said arc being of extent less than 180°, means electrically responsive to radially strictive action of said material, and relatively heavy backing-plate means relatively rigidly connecting the arcuate limits of said radially strictive material.

2. A transducer comprising a cylindrical arc of radially strictive material, means electrically responsive to radially strictive action of said material, means relatively rigidly connecting the arcuate limits of said radially strictive material, and a layer of pressure-release material between said arc and said last-defined means.

3. A transducer comprising a wound cylindrical arc of magnetostrictive material, said arc being substantially less than 180°, and a return path comprising a stack of laminations of flux-conducting material spanning the arcuate limits of said magnetostrictive material, said return path including a permanent magnet.

4. A transducer comprising an elongated generally cylindrical arc of magnetostrictive material of less than 180°, flux-conducting means extending chordally of the arcuate limits of said magnetostrictive material, means for magnetizing the path defined by said arc and by said chordally extending means, and a signal winding coupled to said path.

5. A transducer comprising an elongated generally cylindrical arc of laminated magnetostrictive material of less than 180°, a magnetic return path connecting the limits of said arc and including a permanent magnet, and a signal winding linked to a portion of the path defined by said arc and said chord.

6. A transducer comprising an elongated generally cylindrical arc of laminated magnetostrictive material, said arc being less than 180°, a return path continuously connecting limits of said arc and extending chordally of said arc, said return path including a stack of laminations of flux-conducting material exhibiting relatively low magnetostrictive effect, and means for magnetizing the magnetic path defined by said magnetostrictive and relatively non-magnetostrictive materials.

7. A transducer according to claim 6, in which said magnetizing means is a permanently magnetized ferrite block effectively coextensive with the longitudinal axis of said arc.

8. A transducer comprising an elongated generally cylindrical arc of laminated magnetostrictive material of less than 180°, a signal winding coupled to said arc, the respective turns of said winding extending longitudinally of said arc, and a return path connecting the limits of said arc and extending chordally of said arc, said return path including a permanent magnet and flux-conducting material exhibiting relatively low magnetostrictive properties.

9. A transducer comprising a flat non-magnetic back plate, substantially flat magnetic-flux-conducting means bonded to said back plate and extending along an elongated axis, a generally cylindrical arc of less than 180° of magnetostrictive material secured at its arcuate limits to said flux-conducting means so that said flux-conducting means defines a chordally extending return path for flux in said arc, means for magnetizing said path, and a signal winding linked to said path.

10. A transducer comprising an elongated back plate of non-magnetic material, two substantially parallel elongated stacks of laminations of flux-conducting means bonded to one side of said plate, permanently magnetized means connecting said stacks and substantially coextensive with the longitudinal axis of said transducer, a cylindrically arcuate magnetostrictive member connected at its arcuate ends with said respective stacks, and a winding linked to said arcuate member.

11. A transducer according to claim 10, in which the volume of said transducer within said arc is filled with a potting of hard plastic material.

12. A transducer according to claim 10, in which the faces of said stacks away from said plate have elongated grooves facing upwardly therefrom and receiving the arcuate limits of said magnetostrictive member.

13. A transducer according to claim 10, and including a boot of rubber-like material completely encasing said back plate and said arcuate portion and including elongated flanges projecting outwardly of the arcuate limits of said transducer and extending coextensively with the longitudinal axis of said transducer.

14. A transducer comprising a flux-conducting path defined by an arcuate portion and a chordally extending portion connecting the limits of said arcuate portion, said chordally extending portion being less than twice the radius of said arc, one of said portions being of magnetostrictive material and the other of said portions being of flux-conducting material exhibiting relatively little magnetostrictive effect, means for polarizing said path, and a signal winding linked to said path.

15. A transducer array comprising a plurality of elongated transducers of segmental cross-section, the arcuate extent of said cross-section being substantially less than 180°, said transducers being oriented in relative close side-by-side relation with their elongated axes parallel to each other and with their cylindrically arcuate faces directed predominantly in the same direction, whereby maximum response in said direction may be realized.

16. A transducer array comprising a plurality of electroacoustic transducer elements of segmental cross-section and having predominant elongated axes parallel to each other, each of said transducer elements having integral yieldable mounting flanges extending outwardly of the arcuate limits of each said transducer, said flanges being longitudinally coextensive with each said transducer element, and means securing adjacent mounting flanges of adjacent transducers together.

17. An array according to claim 16, and including means supporting said mounting flanges in essentially the same plane, with the arcuate faces of said transducers directed in the same general direction.

18. A transducer according to claim 16, and including damping means supported adjacent the chordally extending faces of said transducer elements.

19. A transducer according to claim 16, and including compliant reflecting means behind the chordally extending faces of said transducer elements.

20. A transducer, comprising a cylindrical arc portion of magnetic flux-conducting material of arcuate extent less than 180°, a chord portion of magnetic-flux-conducting material spanning said arc and rigidly connected to the arcuate limits thereof, one of said portions being magnetostrictive and the flux path defined by said portions being polarized, and a signal winding linked to one of said portions.

References Cited in the file of this patent

UNITED STATES PATENTS 2,391,678     Bundy  ---------------- Dec. 25, 1945